Oct. 20, 1970

I. GROB 3,534,601

FLUID FLOW METER

Filed April 11, 1968

INVENTOR.
Irwin Grob
By Flynn & Frishauf
Attorneys

United States Patent Office 3,534,601
Patented Oct. 20, 1970

3,534,601
FLUID FLOW METER
Irwin Grob, 36 Reynolds Road,
Glen Cove, N.Y. 11542
Filed Apr. 11, 1969, Ser. No. 815,415
Int. Cl. G01f 1/00
U.S. Cl. 73—204                                    14 Claims

ABSTRACT OF THE DISCLOSURE

A heat exchanger is placed in the path of a fluid such as air, the flow rate of which is to be measured, and a substantially constant amount of heat is imparted to a heat transfer fluid flowing in a closed circuit system through the heat exchanger. The flow rate of the fluid such as air is then determined as a function of the difference between the temperature of the fluid such as air in the vicinity of the heat exchanger and the equilibrium temperature of the heat transfer fluid.

---

This invention relates to a fluid flow meter and more particularly to a fluid flow meter adapted to measure the velocity of a fluid such as air flowing through a conduit or the like.

The fluid flow meter of the present invention can be used to measure the flow of gases or liquids through a conduit. However, the device is particularly suitable for measuring gaseous fluid flow, such as air flow, in air conditioning and ventilating systems.

Various systems have heretofore been proposed for measuring air flow through the conduits in air conditioning and/or ventilating systems. However, the majority of the prior art systems either utilize relatively complex and expensive equipment or place a substantial part of the measuring apparatus in the stream of the air flow, thereby impeding the flow and substantially altering the temperature of the air flowing in the air conditioning or ventilating system. Also, many of the prior art systems are not capable of determining the average velocity of the fluid flowing in the duct or conduit when there is high fluid turbulence and wherein the fluid velocity varies at different points along a sectional area of the duct or conduit. Further, many of the prior art systems require frequent calibration due to physical variations in the components of the systems.

Therefore, the main object of the present invention is to provide apparatus for determining the average fluid velocity in a duct or conduit even when there is turbulent fluid flow wherein the velocity at different points of a sectional area of the duct is not constant.

Another object of the present invention is to provide a flow meter which does not substantially drop the pressure or substantially alter the temperature of the fluid flowing in the conduit.

Still another object of the invention is to provide a fluid flow meter that requires no batteries or D-C current sources, which operates off of commercially available alternating current and which is readily adaptable for remote reading indicators.

SUMMARY OF THE INVENTION

According to the present invention, a fluid flow meter for measuring the flow of fluid through a duct or the like includes means for measuring the average temperature of the fluid flowing in the duct and a first heat exchanger located in the path of the fluid flow within the duct and a heat transfer fluid medium flowing through the first heat exchanger. Further provided is a second heat exchanger for imparting or removing a predetermined substantially constant quantity of heat to the heat transfer fluid medium and means coupling the first and second heat exchangers in a closed circuit. A pump is provided for pumping the heat transfer fluid medium through the closed circuit and means is provided for measuring the temperature of the heat transfer fluid medium flowing through said closed circuit. Coupled to both of the temperature measuring means is a means for measuring the fluid flow through the duct, the fluid flow being a function of the difference between the temperature of the heat transfer fluid medium after an equilibrium condition has been reached and the temperature of the fluid whose flow is being measured.

BRIEF DESCRIPTION OF THE DRAWINGS

FIG. 4 is a schematic view illustrating an alternate heat exchanger for use in the system of FIG. 1.

DESCRIPTION OF ILLUSTRATED EMBODIMENTS

Figure 1:
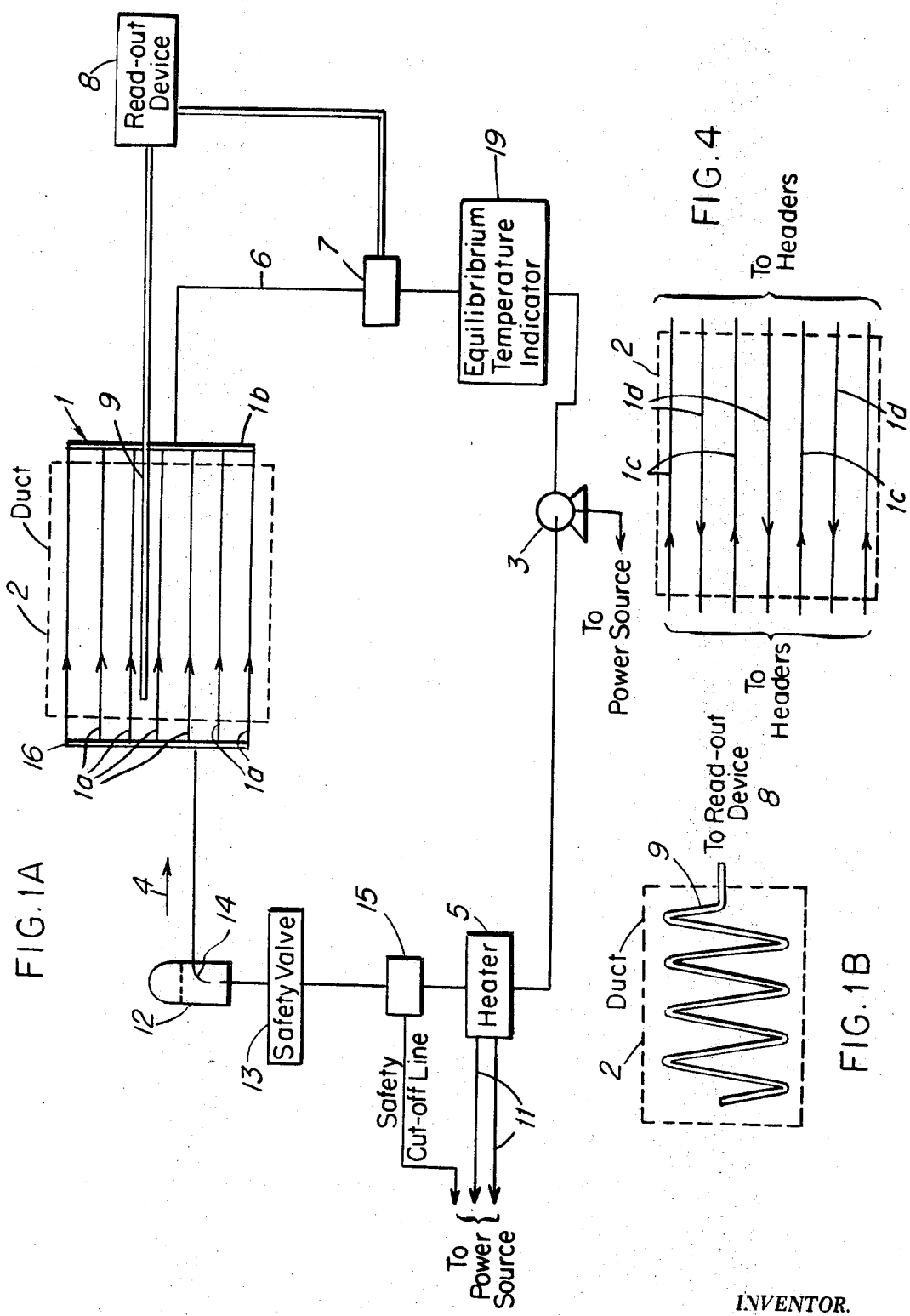
FIG. 1A is a schematic view of a fluid flow meter according to the present invention.
FIG. 1B is a schematic view of the averaging, thermometer to read fluid 2 average temperature (the average thermometer is located in the flow prior to the heat exchanger 16 in the duct)

The present invention is particularly suitable for use with air conditioning and ventilating systems and is particularly adapted to be permanently mounted in a duct thereof that is carrying air. The flow meter is provided with means for remotely reading the air flow through various parts of the system so that appropriate adjustments can be made. The present system can also be used to control other devices such as damper motors to cause the adjustments to be made. The system of the present invention is capable of determining the total fluid flow by utilizing the average velocity thereof, without imposing severe restrictions to the flow within the conduit. The following detailed description will be given for a system used in an air conditioning system wherein the fluid whose flow is to be measured is air.

Referring to FIG. 1A, a heat exchanger unit 1 is mounted substantially within a duct 2 (shown in dashed lines), the header portion 16 of the heat exchanger 1 being mounted outside of the duct 2 and suitably insulated. Heat exchanger 1 transfers heat to the air flowing in duct 2 as air flows over tubes 1a thereof. A heat transfer fluid medium is pumped through the heat exchanger 1 by means of a pump 3 in the direction indicated by the arrow 4 and is heated by means of a heater 5, which in this case is an electric heater operating from a readily available power supply. The output of the heater 5 is constant with temperature change. An expansion tank 12 is also provided to allow for expansion of the heat transfer fluid medium. The heat exchanger 1, pump 3, electric heater 5, and expansion tank 12 are all coupled together in a closed circuit by means of insulated piping 6 and are themselves suitably insulated. Optionally provided is a safety valve 13 coupled to pipes 6 which release the pressure in the system if it exceeds a predetermined value. Also connected to pipes 6 is a temperature sensing device 7 for measuring the temperature of the heat transfer fluid medium flowing through the closed circuit and transferring the temperature reading to a remotely located device 8 which provides direct read-out of the average quantity of fluid, such as air, flowing through duct 2. The location of temperature sensor 7 in the closed circuit is immaterial since the temperature difference of the heat transfer fluid within the closed circuit components is substantially constant after equilibrium. The details of the read-out device 8 will be described hereinbelow.

Figure 2:
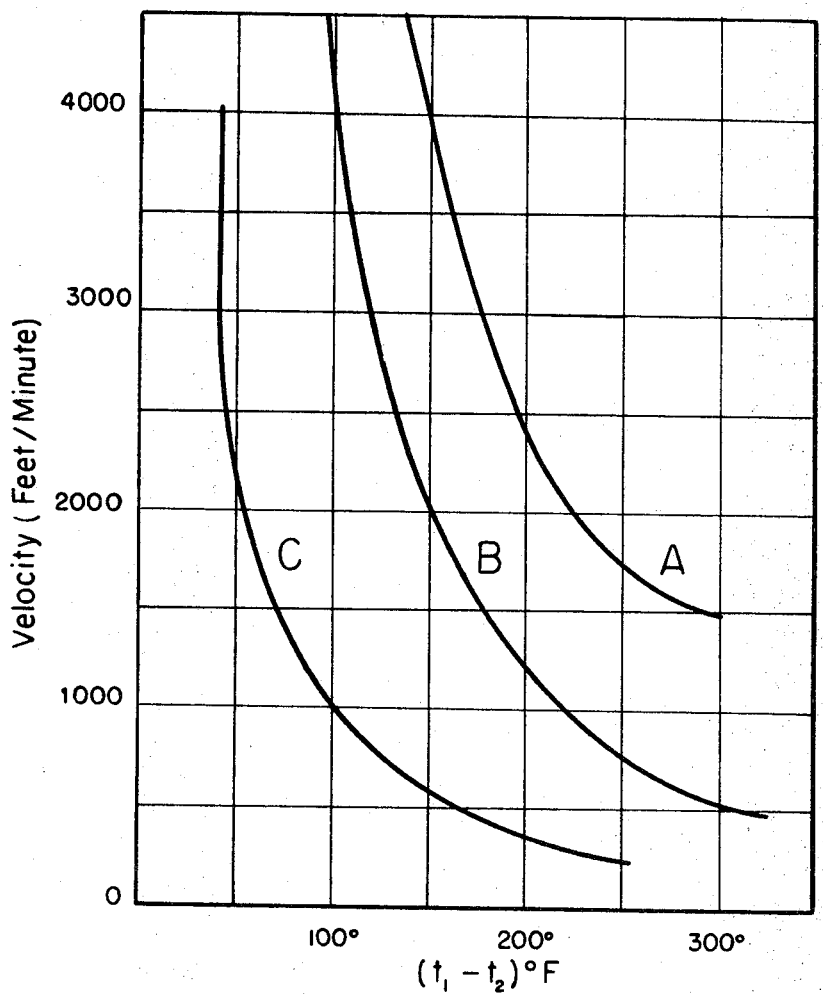
FIG. 2 illustrates a curve showing relationships between fluid flow velocity and the temperature difference between the fluid whose flow is being measured and the fluid flowing in the closed circuit; and the effect of various heat inputs on the relationship of velocity with the difference of temperatures between fluid 1 and fluid 2.

A second temperature sensor 9 is placed within duct 2 and measures the average temperature of the air flowing therein prior to the passage of the air over the tube 1a of heat exchanger 1. Temperature sensing means 9 is also coupled to read-out device 8 which is responsive to the temperature difference between the readings of temperature sensors 7 and 9 to provide a direct read-out of the rate of air flow within the duct 2. This rate of air flow within duct 2 is a function of the difference between the temperature of the air flowing in duct 2 and the temperature of the heat transfer fluid medium flowing within pipes 6 after a steady-state equilibrium condition is reached. The curves of FIG. 2 show the relationship between the temperature difference and the air flow rate induct 2 for specific cases.

The temperature sensing means 7 and 9 may comprise for example, respective pressure thermometers of well known construction. In order to more accurately measure the average temperature of the air flowing in duct 2, the temperature sensor 9 may comprise an averaging bulb (pressure-type thermometer) such as manufactured by the Bristol Company. Such an averaging bulb is shown in FIG. 1B. When pressure thermometers are used, read-out device 8 takes the form of a pair of Bourdon tubes which are coupled to sensors 7 and 9 and which are further coupled together to provide a direct read-out of the air flow rate which is a function of the difference between the temperatures measured by pressure thermometers 7 and 9, respectively. The scale of the read-out device 8 is directly calibrated in units of flow rate of the air flowing in duct 2 (expressed either in average velocity, volume or weight per time unit, or the like). An example of a read-out device 8 for use in the above-described system is a type BD1 differential gauge manufactured by Weksler Instruments Corporation.

In the particular embodiment illustrated in FIG. 1A, the electric heater device 5, the expansion chamber 12 and the safety valve 13 are indicated as separate units. Alternatively, the heater 5, the expansion chamber 12 and the safety valve 13 which are optional safety devices, may be provided as integral devices installed at one point in the closed circuit defined by pipes 6. When the heater unit 5, expansion chamber 12 and safety valve 13 are all combined, the heater portion is located at the lower portion of a unit having a shape similar to expansion chamber 12 and is connected to a power source such as an A-C source by means of leads 11. The expansion chamber 12 is then located in the upper portion of the combined unit and the safety valve 13 is located on the upper surface of the combined unit. A pipe 14 (shown also in FIG. 1) is situated within the combined unit and is located below the liquid level to receive the heated liquid and transfer it to the heat exchanger 1 via insulated pipes 6. The operation of this type of combined heater, expansion chamber and safety valve should be apparent to those skilled in the art, and therefore, a further detailed description thereof is not given herein.

Further provided is a high limit thermostatic device 15 which senses the temperature in the closed circuit and automatically shuts down the flow meter system if a predetermined temperature is exceeded. This is an optional safety feature.

The electric heater 5 is designed to impart a substantially constant predetermined quantity of heat to the heat transfer fluid medium flowing through pipes 6 regardless of the temperature of the fluid passing through. However, in practice, this will be the case only when the electric power source for the heater provides a substantially constant output. Variations in the voltage supplied to the heater will cause variations in the amount of heat supplied to the heat transfer fluid medium and a compensating device must be provided as shown in detail in FIG. 3. However, for the purposes of the present discussion, and in the following example, it will be assumed that the heater 5 imparts a substantial constant predetermined amount of heat to the heat transfer fluid medium.

The pump 3 is designed to pump the heat transfer fluid at a substantially constant flow rate. The pump 3 also generates a small amount of heat ($q_p$) which is absorbed by the heat transfer fluid medium flowing therethrough. The pumping rate of pump 3 must be high enough so that the temperature difference of the heat transfer fluid flowing through the tubes 1a of heat exchanger 1 is a minimum.

In the following discussion, the heat available to the heat exchanger 1 is denoted as $q_E$, the heat supplied by the heater 5 is denoted as $q_H$, the heat supplied by the pump is denoted as $q_p$, and the heat loss of the system is denoted as $q_L$. The system components are insulated to minimize heat losses $q_L$, so $q_L$ can be considered negligible. Thus, the amount of heat available to the heat exchanger 1 is given by the following equation:

$$q_E = q_H + q_p - q_L = \text{constant} \tag{1}$$

The system operates as follows. On starting the system, the read-out instrument 8 is not read-out until the temperature of the heat transfer fluid medium flowing through the heat exchanger 1 (which may be oil or water or any suitable fluid) reaches its maximum equilibrium temperature. In practice, this maximum temperature will be reached in a predetermined amount of time which will vary in accordance with the characteristics of the system. A device 19, shown in FIG. 1, such as a timer, may be provided to indicate and/or signal when enough time has elapsed to allow the heat transfer fluid to reach maximum temperature. Indicating device 19 of FIG. 1 may be a thermostat to monitor the temperature of the heat transfer fluid medium to determine when the equilibrium condition has been reached and to provide a corresponding signal. In order to speed up the warm-up period, a by-pass may be provided in the closed circuit to cause the heat transfer fluid medium to by-pass heat exchanger 1 during the start-up period. The by-pass device can be rendered inoperative after the heat-transfer fluid medium has reached the proper approximate temperature, either manually or by an automatic temperature operated valve or the like. Indicator lights or the like may be connected to the devices which indicate that the equilibrium operating temperature has been reached to signal the operator that readings can be taken.

When the fluid flowing through heat exchanger 1 has reached its maximum (or equilibrium) temperature, the total heat being produced by the system less minor losses equals the amount of heat being absorbed by the air flowing in the duct 2 as it flows over the heat exchanger 1 and is considered to be constant. Under these conditions, referring to "Heat Transmission" by William H. McAdams, McGraw-Hill, 3rd Edition; ASHRAE Guide, 1940 Ed., chapter on "Heat Transfer"; and "Introduction to Heat Transfer," A. I. Brown and S. M. Marco, 3rd Ed., chapter on "Forced Convection," it can be shown that:

$$t_1 - t_2 = K/V^n$$

where:

$t_1$ = temperature of the heat transfer fluid medium flowing through heat exchanger 1

$t_2$ = air temperature flowing through duct 2

K = constant, which is a function of the characteristics of duct 2 and of the fluid flowing through duct 2 and heat exchanger 1

V = velocity of air n = a constant which is a function of: (1) the characteristcis of the heat exchanger 1; and (2) the fluid and the type of flow (such as laminar or turbulent) within the duct 2 (see "Heat Transmission," by William H. McAdams, McGraw-Hill, 3rd Edition, chapter on "Heating and Cooling Outside Tubes").

The temperature $t_1$ is measured by means of pressure thermometer 7 and the temperature $t_2$ is measured by means of pressure thermometer 9. Since the quantities K and $n$ are constants, they can be built into the characteristics of the read-out device 8. The read-out device 8 is responsive to the temperature difference between $t_1$ and $t_2$ to provide a direct read-out of the velocity V of the air flowing in the duct 2. FIG. 2 illustrates curves V vs. $(t_1-t_2)$ for a specific application. It should be clear that the values denoted in FIG. 2 will be different for different systems utilizing the flow meter of the present invention. Curves A, B and C of FIG. 2 are for different values of $q_E$, curve A representing the higher value of $q_E$ and curves B and C representing successively lower values thereof.

Thus, it is seen that the basic theory of the present invention is to set up a heat balance (or equilibrium condition) between the heat being produced by the pump 3 and the heater 5 and the heat being absorbed by the air flowing through duct 2 from the tubes 1a of heat exchanger 1. In order that the system operate properly, the amount of heat being produced by the heater and pump should remain substantially constant. Also, the rate of flow of the heat transfer fluid medium through the closed circuit defined by pipes 6 should also be substantially constant. In practice, each flow meter according to the present invention must be designed for individual use in a system having a specific duct size, a specific range of air temperatures and a specific range of air flows. Then, the size of the heat exchanger 1, the amount of heat required to be supplied by the heater 5 and the capacity of the pump 3 is chosen to provide a flow meter which provides a direct read-out of air flows within the specific range.

In a particular example, a heat exchanger 1 comprising one quarter inch tubing and a heater capable of imparting a heat transfer capacity of 410 B.t.u. per foot of tubing has been found capable of serving a ventilating duct having a 36 x 36 inch cross-section handling 18,000 cubic feet of air per minute (which is equivalent to an average velocity V of 2,000 feet per minute). In this example, the heat exchanger 1 comprises 6 ¼ inch tubes spaced 6 inches apart, the pump and heater heat input is 2.3 kw. and the pump has a pumping capacity of 3.7 gallons per minute. Also, the constant $n=0.60$. After equilibrium is reached, the temperature drop of the heat transfer fluid in tubes 6 due to heat exchanger 1 is approximately 4° F. and the temperature rise of the air flowing in duct 2 due to the installation of the present system within the duct 2 is only approximately 0.4° F. In practice, a temperature rise of only 0.4° F. in the air flowing through the ventilating duct 2 is not objectionable, however, this can be further reduced as explained later. Therefore air temperature in duct 2 could be sensed either before or after heat exchanger 1 without substantially effecting system accuracy. In this system, the temperature of the air in duct 2 is approximately 50° F. (moderate changes of the air temperature will not appreciably change the result) and the temperature of the heat transfer fluid medium flowing in the closed circuit including heat exchanger 1 is approximately 200° F. (with 50° F. air).

If the air temperature ($t_2$) were 100° F. the temperature of the heat transfer fluid in the closed circuit would be approximately 251° F. for a given flow rate. In either case, $t_1-t_2$ equals 150° F., approximately, and the flow rate indication would be correct.

If the instrument were to measure air at larger temperature differences, or if the instrument were to measure flow rates of other fluids where the change of surface coefficient of resistance to heat flow (outside of tubes 1a) with respect to a change of fluid temperature ($t_2$) is large, the instrument could correct for this condition by having a non-linear ratio in the linkage of the read-out device 8 (i.e. the type BDI differential gauge) which reads the temperature $t_2$.

Variation in the size of the tubes 1a of heat exchanger 1 will require corresponding changes in the heat input supplied by heater device 5. For example, if the tube 1a diameter were made smaller, the required heat input would be reduced. The optimum values will depend upon the particular characteristics of the ventilating system with which the flow meter is used. The smaller the tubes the less heat will be given up to the air stream in duct 2. In order to compensate for a higher temperature drop through the tubes a reverse flow system as indicated in FIG. 4 may be used.

Figure 3:
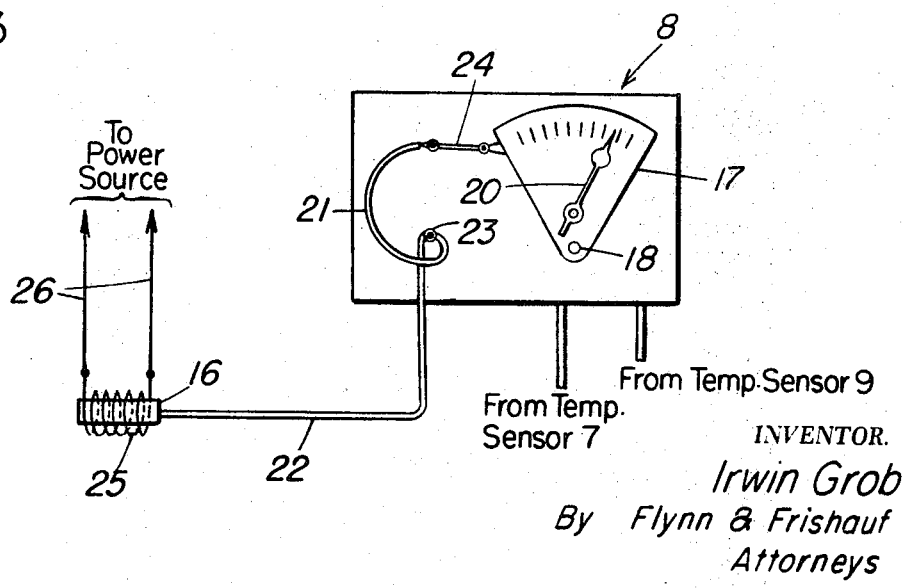
FIG. 3 illustrates a device for compensating for variations in the heat output of the heater of FIG. 1.

Referring to FIG. 3, there is shown a device for compensating for variations in the A-C line voltage supplied to the heater device 5. In order to ensure that the flow meter of the present invention provides accurate readings, it is necessary that the amount of heat supplied by the electric heater device 5 to the heat transfer fluid medium flowing through the closed circuit comprised of pipes 6 be substantially constant. However, in actual practice, the voltage supplied to the heater device 5 via lines 11 of FIG. 1 will not be constant. A voltage regulator may be utilized to ensure that the voltage fed to heater device 5 remains constant, but this is a relatively bulky and expensive device.

An alternative and less expensive solution is shown in FIG. 3. A temperature sensor 16 which preferably comprises a pressure thermometer is located in proximity to an auxiliary electric heater coil 25 to sense the heat output thereof. Heater coil 25 is connected to the same power source (by leads 26) as main heater 5 and voltage variations cause substantially the same percentage variations in the heat outputs of heaters 5 and 25. The read-out device 8 includes a scale 17 which is pivotally mounted at pivot point 18. A pointer 20 is provided which is coupled to the Bourdon tubes which are in turn coupled to temperature sensors 7 and 9 (of FIG. 1) as indicated in FIG. 3. Pointer 20 indicates the flow rate of the air in duct 2 on the scale imprinted on scale 17. If the heat output of the electric heater 5 varies due to variations in the supply voltage, then the reading of pointer 20 will be in error. In order to compensate for this, the temperature sensor 16, which senses the corresponding variations in the heat output of auxiliary electric heater 25, is coupled to a third Bourdon tube 21 by means of a tube 22 and a coupling 23. The Bourdon tube 21 is mechanically coupled to scale 17 by mechanical means 24 (shown in dotted lines). As the heat output of the electric heater 25 varies, the Bourdon tube 21 will cause the scale 17 to be moved about the pivot point 18 by an amount sufficient to compensate for the erroneous readings caused by the variations in supply voltage. The mechanical linkage between the Bourdon tube 21 and the scale 17 is designed to provide the appropriate degree of correction, depending upon the characteristics of the particular system in which the flow meter is used.

The apparatus shown in FIG. 3 for compensating for variations in supply voltage to the electric heater 25 is shown only by way of example. It should be clear that various other schemes could be used. For example, an electrical temperature sensor may be used in place of pressure thermometer 16 and an electrically operated control system could be used to control the position of the scale 17.

The coil 16, or the like, may also be coupled directly to heater 5 or a device may be used to sense the voltage variations directly and then move scale 17 about pivot 18 in an appropriate manner.

The system of the present invention may be further varied by using electrical temperature sensors in place of pressure thermometers 7 and 9 of FIG. 1 and feeding the electrical outputs thereof to an electronic circuit for electrically determining the temperature difference $t_1-t_2$. Electrical means can also be provided to compute and read out the flow rate of the air flowing in duct 2. This variation is clearly within the scope of the present invention and the particular design thereof could be implemented by one skilled in the art. With such an electrical system, an electrical temperautre sensing device (such as 16 of FIG. 3) could be used to sense the output of electrical heater 25. The output of the electrical temperature sensor 16 can then be applied to the electrical circuit which determines the temperature difference $(t_1-t_2)$ to provide the proper electrical correction to compensate for variations in line voltage which cause variations in heat output of electric heater 5.

The flow meter of the present invention can also be used to measure fluid flow, such as hot fluid flow, an industrial process system. In this case, the heat transfer fluid medium within the closed circuit defined by pipes 6 of FIG. 1 is cooled by means of a substantially constant refrigerating device which replaces the heating device 5 of FIG. 1. This type of system operates substantially as described above in that the temperature difference between the heat transfer fluid medium flowing in the closed circuit and the hot fluid flowing in this system is a function of the difference of their temperatures. Such a device has not been illustrated in the drawings, but clearly falls within the scope of the present invention. The particular design of such a system should be apparent to one ordinarily skilled in the art in view of the above description of the invention.

In order to increase the accuracy and efficiency of the system according to the present invention, the direction of the flow and size of the tubes in the heat exchanger 1 may be varied. FIG. 4 indicates counterflow in alternate tubes 1c and 1d (adjacent to each other) which are all in the same plane. An additional set of tubing similar to FIG. 4 and set at right angles to the first set (all in virtually the same plane) could be used for additional accuracy if required. It is evident that many variations of the tube formation, including circular or curved variations are possible and are within the scope of this invention. Also, the heat exchanger tubing does not have to be circular in diameter, as the particular application may warrant. Fins or plates may also form a part of heat exchanger 1.

In addition alternate segments of the tubes 1a of FIG. 1 and tubes 1c and 1d of FIG. 4 may be insulated against heat flow, with alternate segments of the tube left free for heat transfer (for example, along the length of the heat exchanger 1 tubing, 6 inches of tubing would be insulated, 4 inches left uninsulated and this would be repeated). This would reduce the power requirements of the instrument and also would further reduce the temperature rise of the air in duct 2, without especially affecting the efficiency of the system.

Alternatively, in order to lower the temperature rise of the air flowing in duct 2 and to reduce the kw. input to the system (i.e. to reduce the power consumed by heater 5), the leading and trailing edges of the heat exchanger tubes 1a, with respect to the direction of air flow in duct 2, could be insulated. The insulation preferably has an airfoil-type configuration to reduce resistance to air flow. Thus heat transfer between tubes 1a and the air takes place mainly along the upper and lower portions of the heat exchanger tubes. The heat exchanger tubes 1a could have rectangular, square, oval or any other convenient cross-sectional configuration, depending upon system requirements and manufacturing economics.

In practice, the system according to the present invention can provide accurate air flow measurements for an air conditioning system over a wide range of air temperatures. The system also can be used to control damper motors and other controls to maintain a required air flow.

I claim:
1. Apparatus for measuring the flow rate of fluid thruogh a duct or the like comprising:
   means for measuring the temperature of the fluid flowing through said duct;
   a first heat exchanger located in the path of said fluid flow;
   a heat transfer fluid medium flowing through said first heat exchanger;
   a second heat exchanger for imparting or removing a predetermined substantially constant quantity of heat to said heat transfer fluid medium,
   means coupling said first and second heat exchangers in a closed circuit;
   a pump for pumping said heat transfer fluid meduim through said closed circuit;
   means for measuring the temperature of said heat transfer fluid medium; and
   means responsive to both of said temperature measuring means for indicating the average flow rate of said fluid through said duct or the like, said flow rate being a function of the difference between the equilibrium temperature of said heat transfer fluid and of said fluid whose flow rate is being measured.

2. Apparatus according to claim 1 further comprising compensating means responsive to variations in the heat output of said second heat exchanger and coupled to said indicating means for compensating said indicating means for said variations in the heat output of said second heat exchanger.

3. Apparatus according to claim 2 wherein said second heat exchanger is coupled to a power source and said compensating means is coupled to said power source for determining variations in the heat output of said second heat exchanger.

4. Apparatus according to claim 3 wherein said compensating means includes:
   an auxiliary heating unit coupled to the same power source as said second heat exchanger; and
   means coupled to said indicating means for measuring the heat output of said auxiliary heating unit.

5. Apparatus according to claim 1 wherein said second heat exchanger imparts a predetermined substantially constant quantity of heat to said heat transfer fluid medium.

6. Apparatus according to claim 5 further comprising compensating means responsive to variations in the heat imparted by said second heat exchanger and coupled to said indicating means for compensating said indicating means for variations in the heat output of said second heat exchanger.

7. Apparatus according to claim 1 wherein said temperature measuring means includes first and second pressure thermometers for measuring the temperature of said fluid flowing through said duct and of said heat transfer fluid medium, respectively, and wherein said indicating means include a pair of Bourdon tubes coupled to said first and second thermometers, said Bourdon tubes being coupled together and to a scale for indicating the average flow rate of fluid flowing through said duct.

8. Apparatus according to claim 7 further comprising compensating means responsive to variations in the heat output of said second heat exchanger and coupled to said indicating means for compensating said indicating means for variations in the heat output of said second heat exchanger, said compensating means including:
   an auxiliary heating unit coupled to the same power source as said second heat exchanger;
   a third pressure thermometer for sensing the heat output of said auxiliary heating unit;

a third Bourdon tube coupled to said third pressure thermometer; and means coupling said third Bourdon tube to said indicating means for compensating said indicating means.

9. Apparatus according to claim 8 wherein said scale of said indicating means is movable, said third Bourdon tube being coupled to said movable scale for moving said scale in response to variations in the heat output of said auxiliary heating unit which substantially corresponds to variations in the heat output of said second heat exchanger.

10. Apparatus according to claim 1 further comprising means responsive to the temperature of said heat transfer fluid medium to indicate when said equilibrium temperature has been reached.

11. Apparatus according to claim 1 further comprising an expansion chamber coupled in said closed circuit for accommodating expansion of said heat transfer fluid medium.

12. Apparatus according to claim 1 further comprising a safety valve coupled in said closed circuit for releasing the pressure in said closed circuit when said pressure exceeds a predetermined value.

13. Apparatus according to claim 1 further comprising a temperature safety device coupled in said closed circuit for disabling said second heat exchanger when the temperature of the heat transfer fluid medium flowing through said closed circuit exceeds a predetermined value.

14. Apparatus according to claim 1 wherein said means for measuring the temperature of the fluid flowing in said duct is responsive to the average temperature of said fluid in said duct.

References Cited
UNITED STATES PATENTS 1,349,409    8/1920    Crawford.
2,193,762    3/1940    Hirsch et al.

JAMES J. GILL, Primary Examiner

H. GOLDSTEIN, Assistant Examiner